United States Patent
Oh et al.

(10) Patent No.: US 7,742,774 B2
(45) Date of Patent: Jun. 22, 2010

(54) LOCATION-BASED TEXT MESSAGING

(75) Inventors: Seung June Oh, Santa Monica, CA (US); Minah Oh, Los Angeles, CA (US)

(73) Assignee: Virgin Mobile USA, L.P., Warren, NJ (US)

( * ) Notice: Subject to any disclaimer, the term of this patent is extended or adjusted under 35 U.S.C. 154(b) by 380 days.

(21) Appl. No.: 11/652,324

(22) Filed: Jan. 11, 2007

(65) Prior Publication Data

US 2008/0171555 A1 Jul. 17, 2008

(51) Int. Cl.
*H04W 24/00* (2009.01)
(52) U.S. Cl. ............. 455/456.1; 455/414.2; 455/457; 342/388; 340/988
(58) Field of Classification Search ............. 455/466, 455/456.1; 340/426.19, 426.2
See application file for complete search history.

(56) References Cited

U.S. PATENT DOCUMENTS

| | | | |
|---|---|---|---|
| 6,789,012 B1 * | 9/2004 | Childs et al. | 701/209 |
| 6,816,782 B1 * | 11/2004 | Walters et al. | 701/209 |
| 6,885,874 B2 | 4/2005 | Grube et al. | |
| 7,013,148 B1 * | 3/2006 | Ganesh | 455/456.1 |
| 7,020,480 B2 | 3/2006 | Coskun et al. | |
| 7,024,207 B2 | 4/2006 | Gorday et al. | |
| 7,031,728 B2 * | 4/2006 | Beyer, Jr. | 455/456.3 |
| 7,133,498 B2 * | 11/2006 | Cacioppo et al. | 379/45 |
| 7,174,243 B1 * | 2/2007 | Lightner et al. | 701/33 |
| 7,249,160 B2 * | 7/2007 | Nozaki et al. | 709/206 |
| 7,370,079 B2 * | 5/2008 | Murata et al. | 709/206 |
| 7,489,925 B2 * | 2/2009 | Fry et al. | 455/426.1 |
| 2001/0005854 A1 * | 6/2001 | Murata et al. | 709/206 |
| 2002/0129109 A1 * | 9/2002 | Nozaki et al. | 709/206 |
| 2003/0117316 A1 * | 6/2003 | Tischer | 342/357.1 |
| 2003/0149527 A1 * | 8/2003 | Sikila | 701/213 |
| 2004/0176114 A1 * | 9/2004 | Northcutt | 455/466 |
| 2004/0208295 A1 * | 10/2004 | Cacioppo et al. | 379/45 |
| 2005/0049007 A1 * | 3/2005 | Cho | 455/566 |
| 2005/0097463 A1 * | 5/2005 | Yu | 715/531 |
| 2005/0184875 A1 | 8/2005 | Schmandt et al. | |
| 2006/0223518 A1 * | 10/2006 | Haney | 455/420 |
| 2006/0291505 A1 * | 12/2006 | Li | 370/474 |
| 2007/0037582 A1 * | 2/2007 | Mohi et al. | 455/456.1 |
| 2007/0197229 A1 * | 8/2007 | Kalliola et al. | 455/456.1 |
| 2007/0213092 A1 * | 9/2007 | Geelen | 455/556.1 |
| 2007/0281716 A1 * | 12/2007 | Altman et al. | 455/466 |
| 2008/0108370 A1 * | 5/2008 | Aninye | 455/456.1 |
| 2008/0133336 A1 * | 6/2008 | Altman et al. | 705/10 |
| 2008/0133599 A1 * | 6/2008 | Stewart et al. | 707/104.1 |

* cited by examiner

*Primary Examiner*—Lewis G West
*Assistant Examiner*—Nathan Taylor
(74) *Attorney, Agent, or Firm*—Fenwick & West LLP

(57) ABSTRACT

A method and device is provided for transmitting location-based text messages between electronic devices. A mobile electronic device can determine a device's location, create a map of that location, create a text message, embed the map in the text message and transmit the text message to a recipient. The device can also transmit or create navigational directions and update the map and the directions in real time.

5 Claims, 7 Drawing Sheets

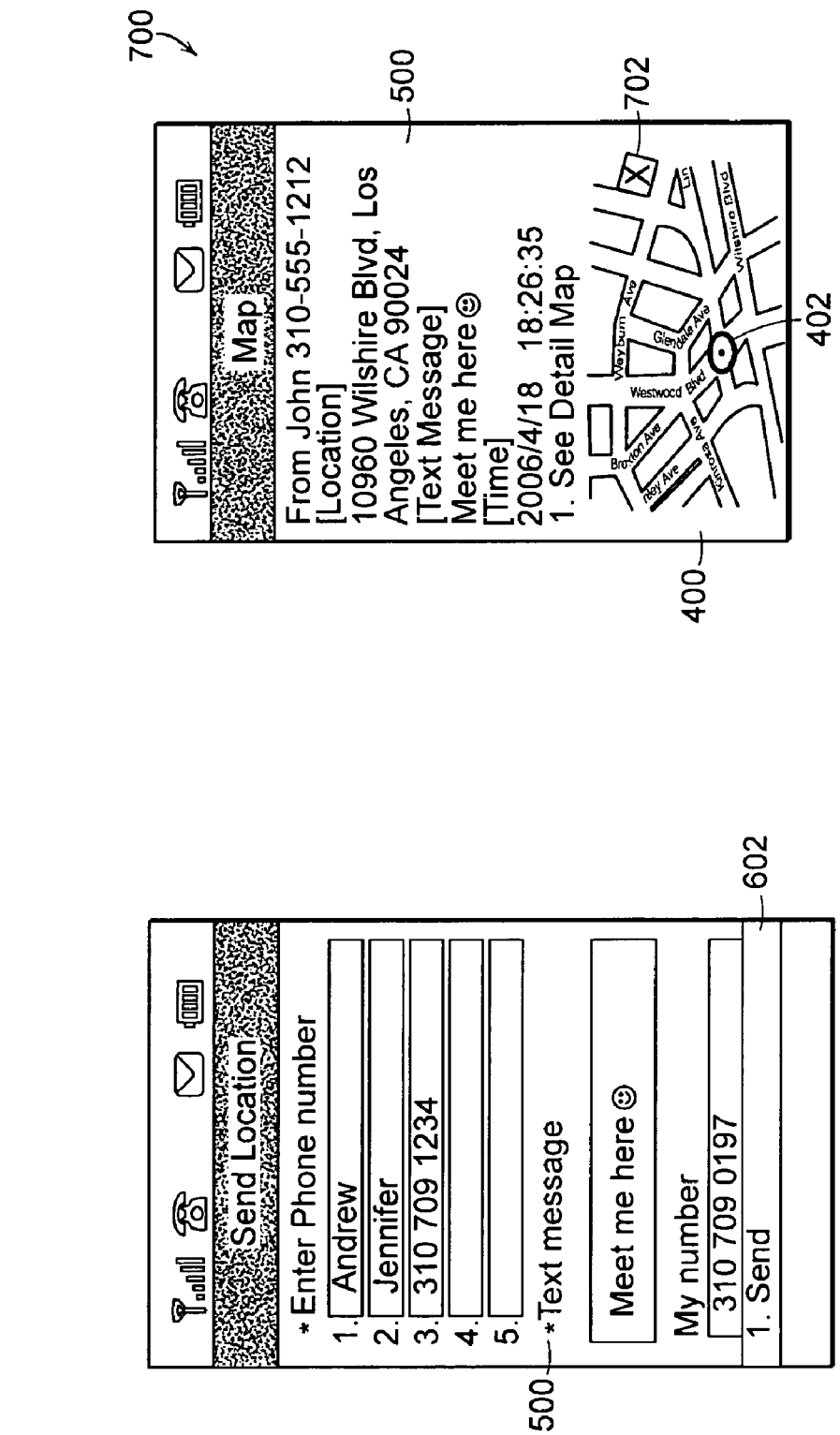

LOCATION-BASED TEXT MESSAGING

FIELD OF THE INVENTION

The present invention relates to the transmission of text messages and specifically to the transmission of location-based text messages.

BACKGROUND OF THE INVENTION

Mobile phone companies offer a service, text messaging, by which a user can send a message containing text to another user over a wireless network. Through a text message, a subscriber or user can instantly chat with another subscriber who is simultaneously logged on to the text messaging service.

Presently, mobile phone companies have expanded their text messaging service to facilitate the transmission of hypertext links. Now, a user can send to a second user a link to a website of interest, if the second user's phone is so enabled. For example, a user can identify his or her location and share it with other users by pasting a hypertext link from a mapping website, such as MapQuest.com, into a regular text message.

SUMMARY OF THE INVENTION

Nevertheless, existing technologies do not provide a simple, expedient method for directly inserting a map of a user's location into a text message.

Therefore, a need exists for a location-based text messaging system. In satisfaction of this need and others, embodiments of the present teachings provide systems and methods for providing location-based text messaging.

In one aspect, the present teachings relate to a method for sending location-based text messages including the steps of determining a first mobile electronic device's geographic location, generating a map of the first mobile electronic device's location, creating a text message, embedding the map in the text message and transmitting the text message to a second mobile electronic device. In some embodiments, the method further includes transmitting to the second mobile electronic device the text message as well as navigational directions starting at the second mobile electronic device's geographic location and ending at the first mobile electronic device's geographic location. In other embodiments, the method further comprises updating the navigational directions and/or updating the embedded map in real time. In still other embodiments, the method further comprises updating the maps on both of the first device and the second device, showing the relative position of the two devices and updating these maps in real time.

In the preferred embodiment, the text message sent from the first device to the second device contains both text and a map of the first device's location. In other embodiments, the text message is transmitted to a website or an email address. Each device's geographic location can be determined, for example, by using global positioning satellites or land-based triangulation.

Another aspect of the present teachings relates to a mobile electronic device for sending and receiving location-based messaging. Preferably, the device is configured to determine its geographic location, generate a map of that location, create a text message, embed the map in the text message and transmit the text message to a second device. In some embodiments, the first device is also configured to transmit to the second device directions from the second device's location to the first device's location. In various embodiments, the device is configured to update the navigational directions and/or the embedded maps on both of the first device and the second device in real time.

Another aspect of the present teachings relates to a device for sending and receiving location-based messages. This device includes a display, an input, a wireless transmitter and receiver, a Global Positioning System receiver, and a processor, wherein the processor is configured to create a map of the device's location-based on GPS signals, display the map on the display, embed the map in a text message and transmit the map to another device upon a user's request.

Another aspect of the present teachings relates to a method for exchanging location-based messages comprising the steps of receiving a request to transmit a text message containing an embedded map indicating a first user's geographic location and transmitting the text message to a second user. In certain embodiments, the method also comprises transmitting to the second user navigational directions by which the second user can meet the first user.

BRIEF DESCRIPTION OF THE DRAWINGS

These embodiments and other aspects of this invention will be readily apparent from the detailed description below and the appended drawings, which are meant to illustrate and not to limit the invention, and in which:

FIG. 6 is a schematic depiction of a screen of a mobile electronic device showing the user's selection of the recipient and the content of the text message according to an embodiment of the present invention.

FIG. 7 is a schematic depiction of a screen of a recipient's mobile electronic device showing the recipient receiving the embedded map according to an embodiment of the present invention.

DETAILED DESCRIPTION OF THE PREFERRED EMBODIMENTS

The present invention will be more completely understood through the following detailed description, which should be read in conjunction with the attached drawings. In this description, like numbers refer to similar elements within various embodiments of the present invention. Within this detailed description, the claimed invention will be explained with respect to preferred embodiments. However, the skilled artisan will readily appreciate that the methods and systems described herein are merely exemplary and that variations can be made without departing from the spirit and scope of the invention.

In general, embodiments of the claimed invention provide systems and methods whereby users can exchange maps and locational information through text messages. Once a first user has determined his or her own geographic location, he or she can share a map of that location with one or more other users. The users can also exchange navigational directions to and from their various geographic locations.

Figure 1:
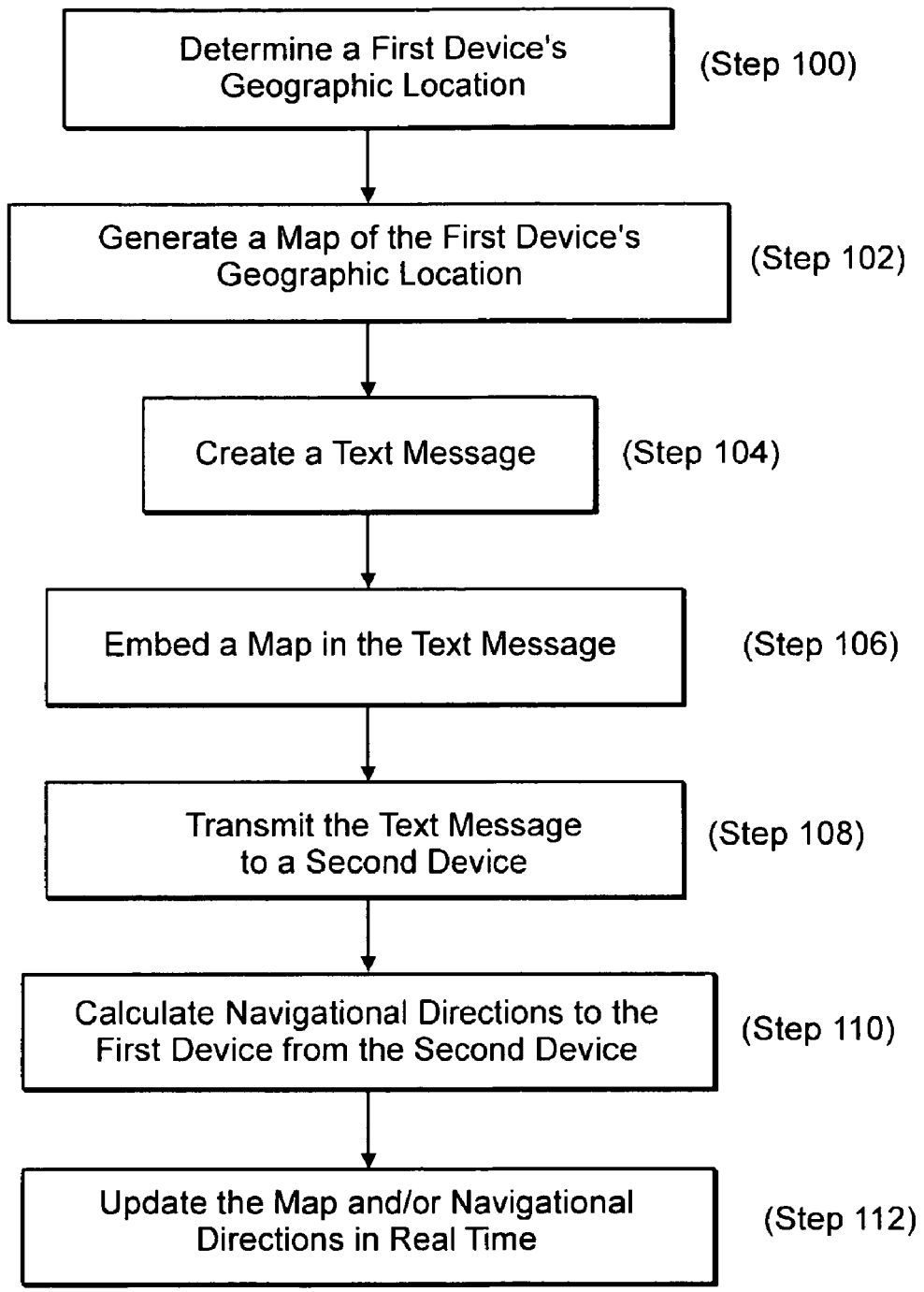
FIG. 1 is a high level flow chart depicting exemplary steps involved in location-based text messaging according to an embodiment of the present invention.

FIG. 1 is a high level flow chart depicting exemplary steps involved in location-based text messaging according to an embodiment of the present invention. As illustrated, the first step comprises determining a first device's geographic location (Step 100). The geographic location of the first device can be determined by using, for example, Global Positioning Satellite "GPS" receivers, through land based triangulation or via any other method, each determining the device's location. The first mobile electronic device is preferably operated by a user or a sender.

Next, a map of the first mobile electronic device's geographic location is generated (Step 102). Using the information obtained from the previous step (Step 100), the processor of the mobile electronic device creates a map of that location and displays the map on the screen of the device. In various embodiments, the map may comprise a street map, a topographic map, a graphic relief map, or any other graphical depiction of the physical world. Preferably, the device's location is indicated on the map with an icon or other marker. In this way, the map immediately illustrates the precise position of the device, and preferably, of the user holding the device. Exemplary electronic maps abound online, and may include maps similar to those provided by MapQuest, Inc., Google, Inc. and Yahoo! Inc.

Next, a text message is created (Step 104). Preferably, the text message is composed by a sender on the first device. The text message may be personal or professional nature, and may include text audio, video, or links to electronically available content. In the preferred embodiment, the sender can select from options available through the device's interface to create the text message. The sender can select one or more message recipients (e.g. a second mobile electronic device or a second user).

The map is then embedded in the text message (Step 106). A map image is acquired from a map database, attached to the message and displayed within the message. In various embodiments, the sender can select from a menu to include the map in the previously created text message (Step 104) or create a new message with an embedded map.

The text message is then transmitted to the second mobile electronic device (Step 108). Once the sender has created the text message (Step 104) and embedded the map (Step 106), the sender can send the message to the recipients (Step 108). The message can be sent through wireless phone networks, GSM, CDMA, WiFi, or any other means known to a person of ordinary skill in the art to transmit wireless signals. The message can be sent to, for example, a recipient's mobile electronic device, a website, an email address or any other receiving means for electronic signals.

Thereafter navigational directions are calculated from the location of the second mobile electronic device to the location of the first electronic device (Step 110). Specifically, once the map has been transmitted (Step 108), the sender can also transmit navigational directions to the recipients of the text message. In some embodiments, the recipients can also independently request that their mobile device calculate navigational directions to the sender. Once the recipient knows his location and the sender's location, the mobile device can launch another application to calculate the navigational directions. The device may use the user's location as parameters to transmit to an online mapping service, such as those provided by Google, Inc., MapQuest, or Yahoo! Inc. In alternate embodiments, a GPS receiver may be used to ascertain turn by turn directions. These navigational directions start at the recipient's mobile electronic device and end at the sender's geographic location. The directions may be, for example, turn by turn directions or any of form of directions known in the art to direct a person from a first location to a second location.

As each user moves, the directions and/or the map may be updated in real time (Step 112). The updated maps can show, for example, the relative position of the sender and recipient and the progress that the sender and recipient have made towards each other.

In some embodiments, a recipient may request that a sender transmits his location, including an embedded map, to the recipient. The sender can comply with the request by, for example, sending a text message with a map of the sender's geographic location embedded in the text message. In certain embodiments, the sender transmits navigational directions so that the recipient can meet the sender.

The operation of the previously discussed method will be further explained with reference to FIGS. 1-8.

Figure 2:
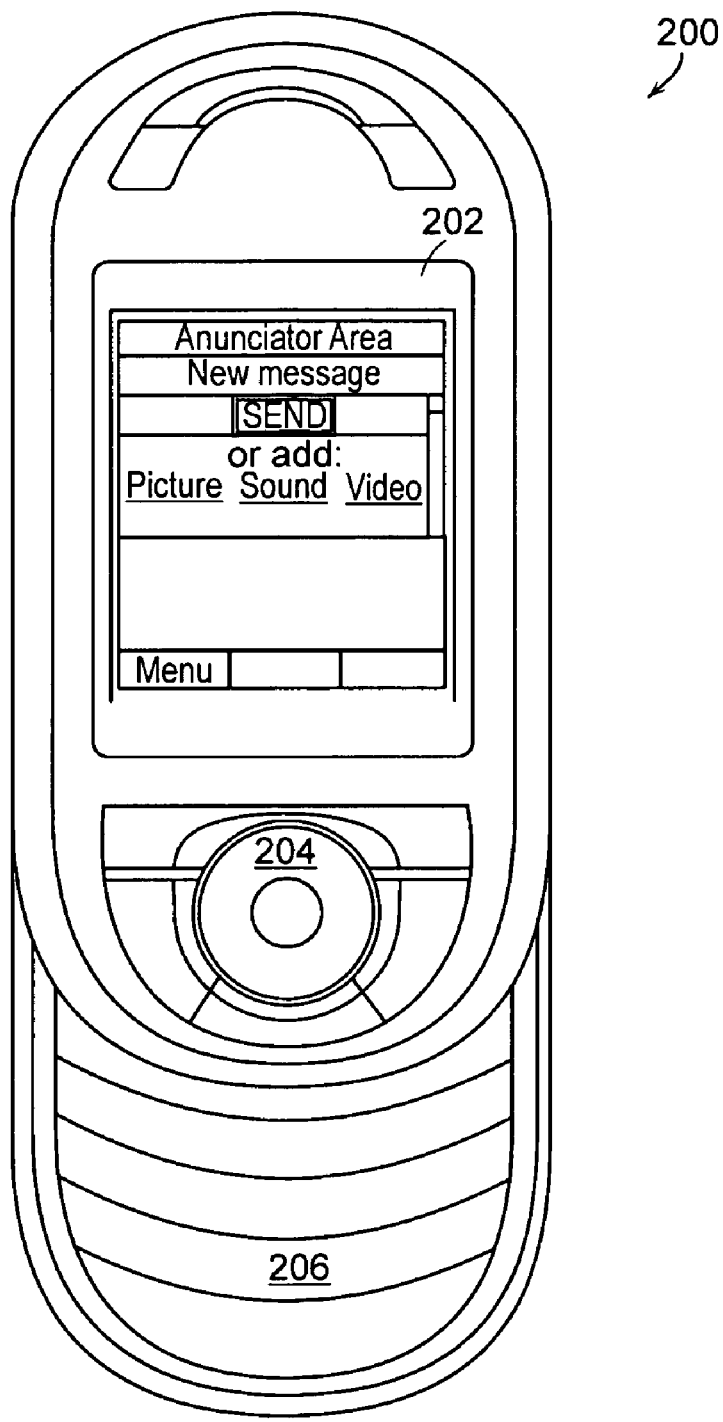
FIG. 2 is a schematic depiction of a mobile electronic device according to an embodiment of the present invention.

FIG. 2 is a schematic depiction of a mobile electronic device according to an embodiment of the present invention. Preferably, the mobile electronic device 200 has a display or screen 202, a scroll button 204, a keypad 206, a wireless transmitter and receiver (not shown), a Global Positioning System (GPS) receiver (not shown) and a processor (not shown). The processor can be configured, for example, to create a map of the device's location-based upon the GPS signals, display the map on the display, embed the map in a text message and transmit to the text message to another device upon the sender's request. The mobile electronic device 200 can be, for example, a mobile phone, a personal digital assistant, a computer, a handheld GPS, a digital camera or any mobile electronic device known to one of skill in the art.

Figure 3:
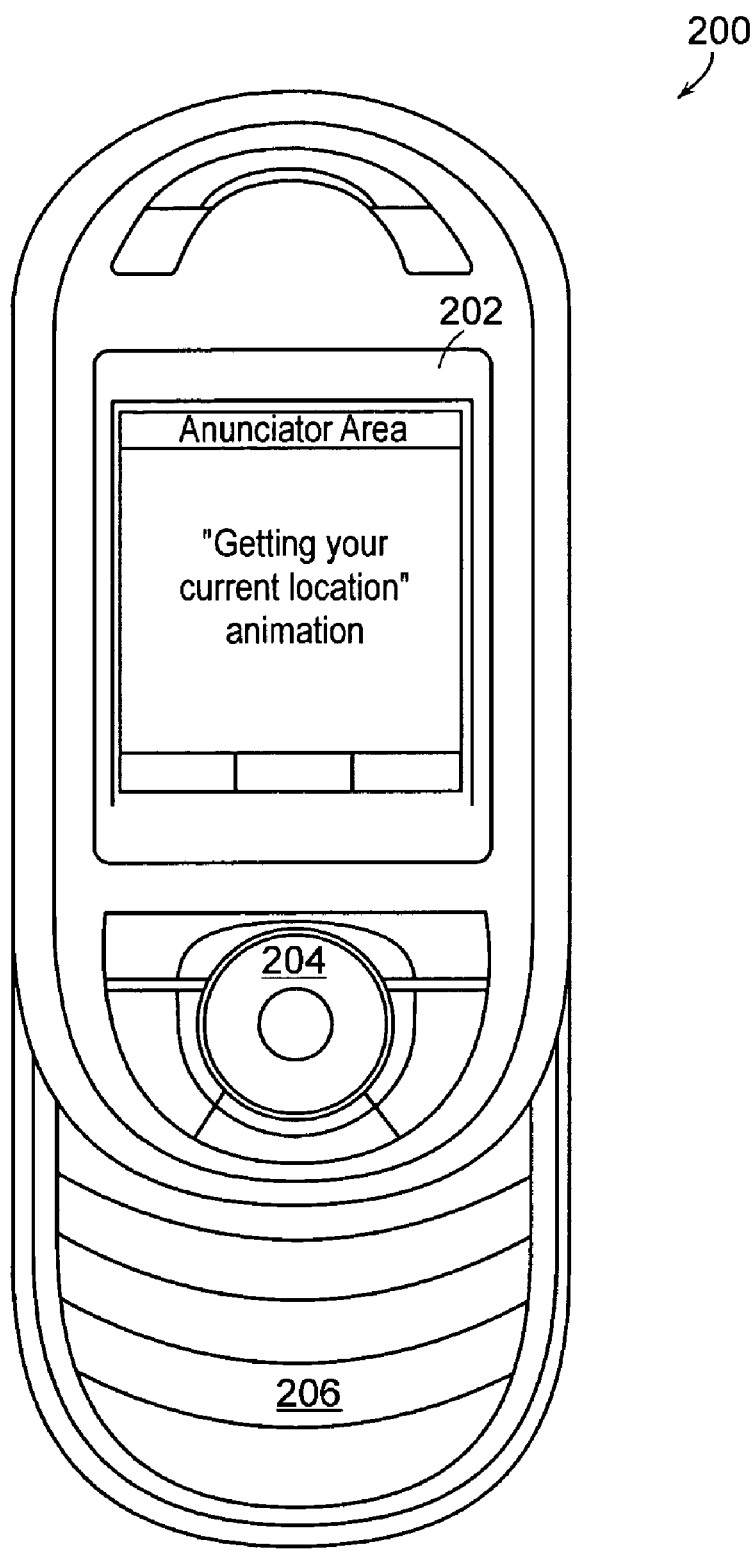
FIG. 3 is a schematic depiction of a mobile electronic device in the process of determining the user's location according to an embodiment of the present invention.

FIG. 3 is a schematic depiction of the mobile electronic device in the process of determining the sender's location. As illustrated, the sender engages the scroll key 204 or keypad 206 to select from a menu (not shown) to determine the geographic location of the device 200 (Step 100). The screen 202 can display, for example, a message or an animation showing the user that the device 200 is retrieving the requested information. As illustrated, the message "Getting Your Current Location" is shown on the screen 202.

Figure 4:
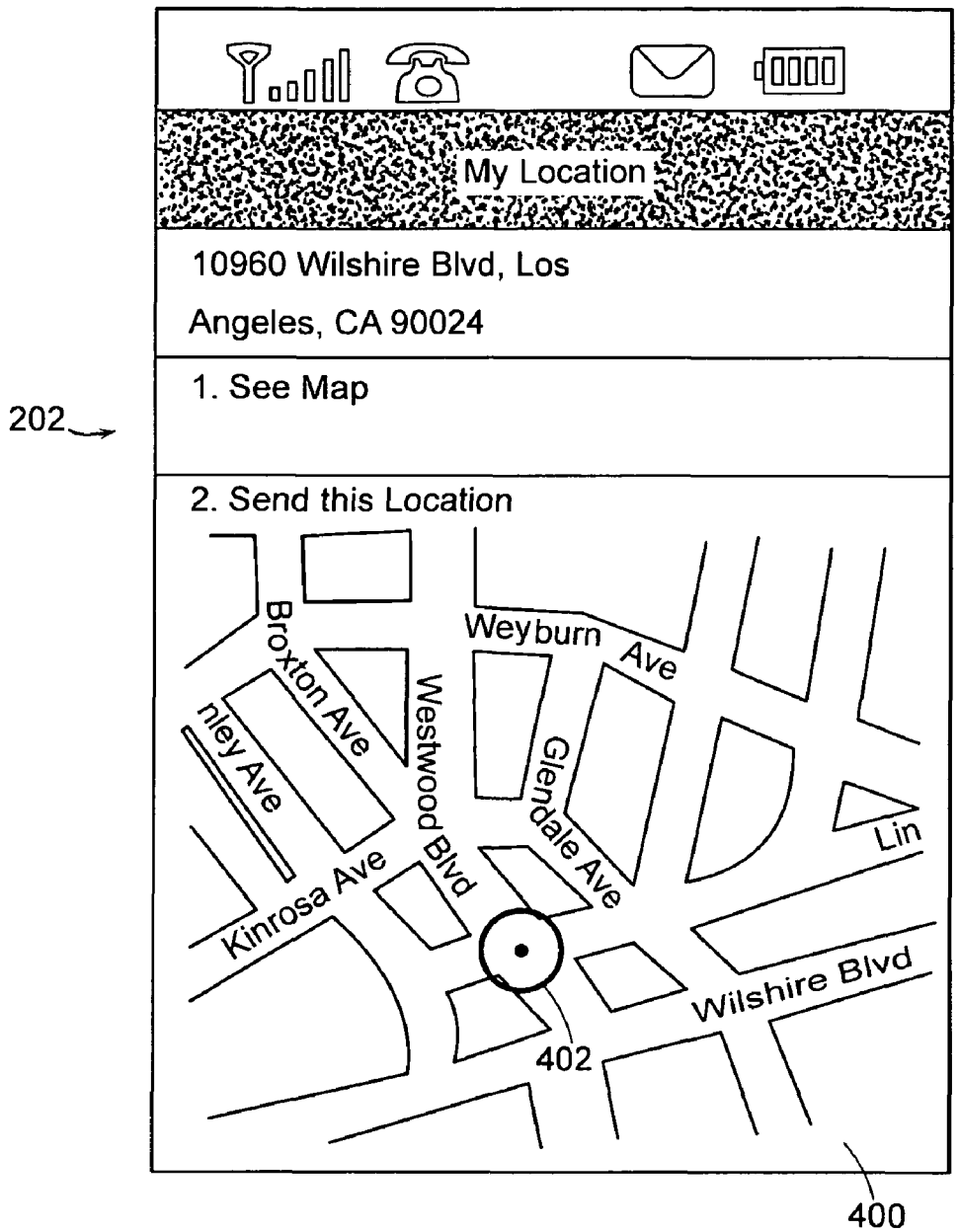
FIG. 4 is a schematic depiction of a screen of a mobile electronic device displaying the user's location according to an embodiment of the present invention.

FIG. 4 is a schematic depiction of a screen of the mobile electronic device displaying the sender's location. Once the device 200 has determined its location, the device can generate a map 400 (Step 102) of the location. The device 200 can then display the map 400 on the screen 202 along with an icon 402 illustrating the user's position. The device 200 can also show the address associated with that location.

Figure 5:
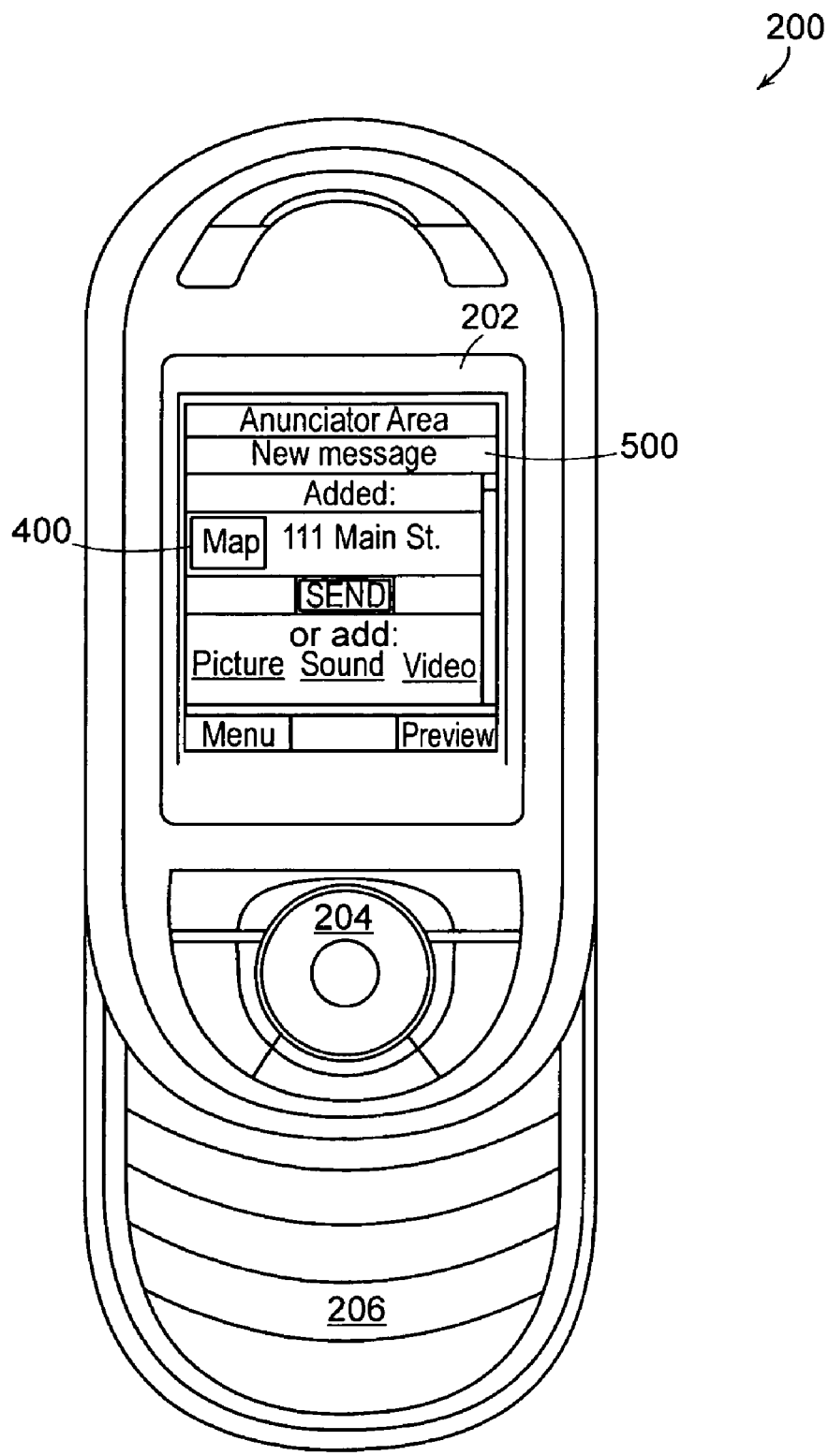
FIG. 5 is a schematic depiction of a recipient's mobile electronic device with a map embedded in a text message according to an embodiment of the present invention.

FIG. 5 is a schematic depiction of the mobile electronic device with a map embedded in a text message. Once device's 200 geographic location is determined (Step 100), the sender may choose, for example, to create a text message 500 (Step 104) using the scroll button 204 or keypad 206. In the preferred embodiment, the sender can embed the map 400 of his location within the text message 500. The sender can also chose to add, for example, text, a picture, sound or a video to the text message 500 to a recipient.

FIG. 6 is a schematic depiction of a screen of a mobile electronic device showing the selection of the recipient and the content of the text message 500. The screen 202 can display one or more selections for the text message 500. In some embodiments, the sender inputs one or more recipients to receive the text message 500. The sender can also add additional information to the text message 500 including the message, for example, "meet me here" or "this is my location." The sender can also add his telephone number to the text message 500. Once the sender has prepared the text message 500 to his liking he may select the send function 602 and send the text message 500 to the listed recipients.

FIG. 7 is a schematic depiction of a screen of a recipient's mobile electronic device showing the recipient receiving the embedded map. As illustrated, embodiments, the screen 700 of the recipient's device displays both text message 500 and the map 400 of the sender's geographic location. The map 400 is updated in real time to show the movements of both the sender 402 and the recipient 702.

Figure 8:
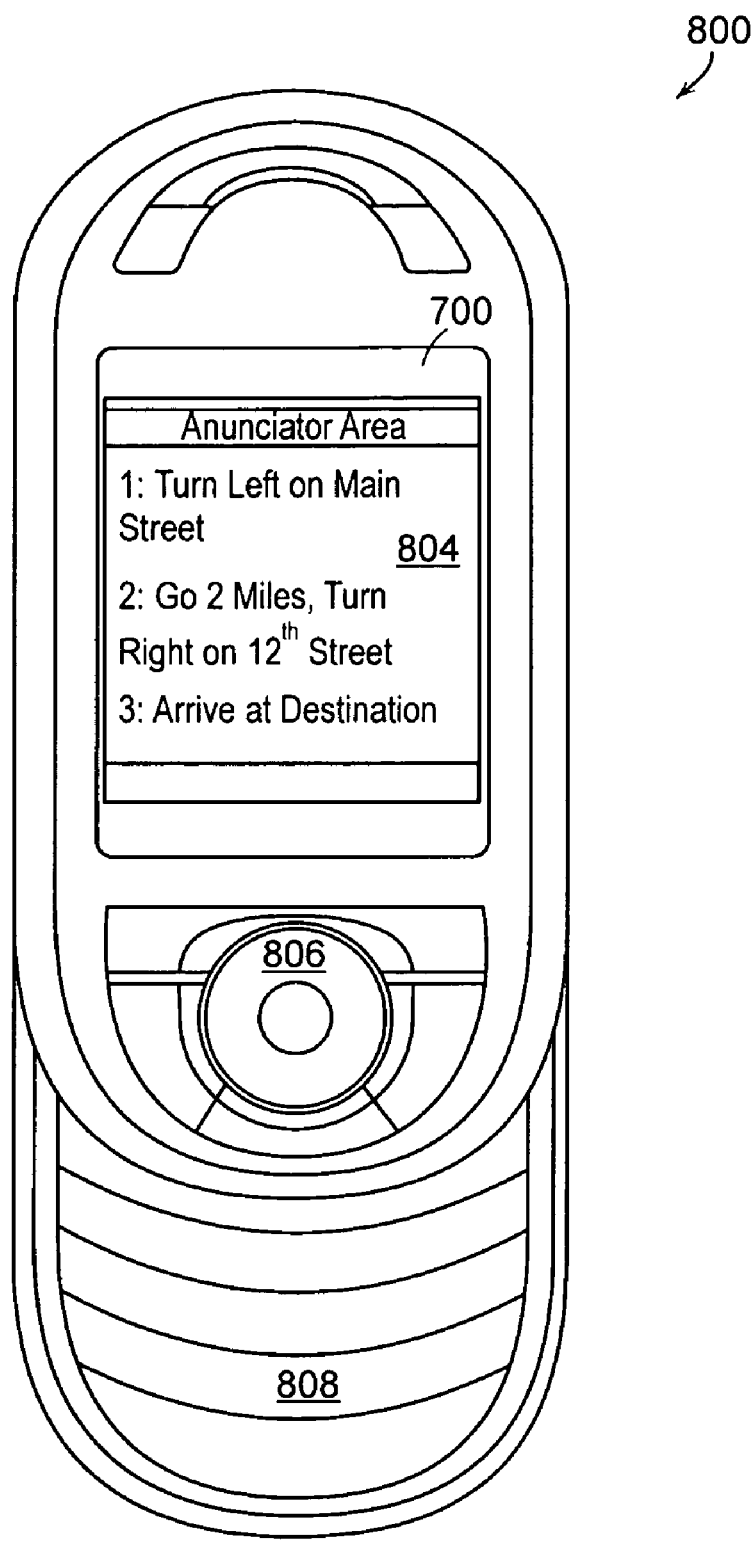
FIG. 8 is a schematic depiction of a recipient's mobile electronic device showing turn by turn directions to the first device's location according to an embodiment of the present invention.

FIG. 8 is a schematic depiction of the recipient's mobile electronic device showing turn by turn directions to the first device's location. The recipient's device 800 shows a screen 802 displaying navigational directions 804 to the sender's location from the recipient's location. The navigational directions are updated in real time to reflect the sender and recipient's changes in geographic location.

The operation of the device may be more fully understood through the following examples.

Bob, a mobile phone user, plans to meet his friend, Betty, at restaurant in a metropolitan area. Bob is already at the restaurant. Bob obtains a map 400 of his geographic location through his GPS enabled phone (Steps 100 and 102). Bob then creates a text message (Step 104), embeds the map in the text message (Step 106), adds the text, "this is a good restaurant, meet me here." He then transmits the text message (Step 108) to Betty. Betty receives the text message and can see the map 400 of the Bob's location. Once Betty has received the text message with the map 400, Betty then calculates turn by turn directions to Bob's location (Step 110), using an internet portal, such as Google. The map 400 and the directions update in real time as the Betty moves toward Bob (Step 112).

In another example, two friends, Sally and Sue, are shopping in an outdoor shopping district, such as Newbury Street in Boston, Mass. The friends decide to split up and meet again in a few hours. After an hour, Sally is thirsty, and wants to find Sue to meet for a latte. Sally determines her location using her phone (Step 100) and generates a map 400 of her location (Step 102). Sally then creates a text message (Step 104) and embeds the map 400 in the message (Step 106). Then, Sally sends to Sue a text message 500 with a map 400 of Sally's location on Newbury Street (Step 108) and a text message 600, "Thirsty? Let's meet for lattes." Sue replies by sending a map 400 of her location to the Sally in a text message 500 with the text "Sure, let's meet in the middle." As Sally and Sue walk toward each other on Newbury Street, the maps 400 on their phones continually update to show their locations in real time (Step 112). Eventually they meet in the middle and have a latte.

In a third example, Jason becomes lost on his way to Ken's house. Jason uses his cell phone to determine his location (Step 100), generate a map of his location (Step 102) and send Ken a text message 500 with a map 400 of his location (Steps 104-108). Once Ken receives Jason's location, Ken uses his phone to create turn by turn directions from Jason's location to Ken's house. Ken sends the turn by turn directions to Jason in a text message (Step 110). Jason then uses those directions to navigate to Ken's house. As Jason follows the directions, they are updated in real time (Step 112). That is, as soon as Jason makes one turn, that turn is removed from the phone's screen 202 and the next turn is displayed. Additionally, if Jason takes a wrong turn, the turn by turn directions will instantly update and recalculate the directions based on the wrong turn (Step 112). Eventually, Jason will arrive at Ken's house.

Variations, modifications, and other implementations of what is described herein will occur to those of ordinary skill in the art without departing from the spirit and scope of the invention as claimed. Accordingly, the invention is to be defined not by the preceding illustrative description but instead by the spirit and scope of the following claims.

What is claimed is:

1. A method for sending a location-based text message, the method comprising the steps of:
   determining a geographic location of a first mobile electronic device by a process on the mobile electronic device;
   receiving a geographic location of a second mobile electronic device;
   generating a map of the first mobile electronic device's geographic location and of the second mobile device's geographic location;
   receiving a text input via an input interface of the first mobile electronic device;
   creating a text message based on the received text input;
   combining the map with text message at the first mobile electronic device;
   launching an application at the first mobile electronic device to display the map, wherein the application updates the map in real time to show movements of the first and second mobile electronic devices; and
   transmitting the combined map and text message to the second mobile electronic device responsive to a request from a user received via the input interface of the first mobile electronic device, wherein the second mobile electronic device is configured to launch an application to display the map to show the location of the first mobile electronic device and the location of the second mobile electronic device, and wherein the application at the second mobile electronic device is configured to update the map automatically in real time to show movements of the sending and receiving devices.

2. The method of claim 1, wherein each of the first and second mobile electronic devices is a mobile phone.

3. The method of claim 1, wherein the geographic location of the first mobile electronic device is determined using global positioning satellites.

4. The method of claim 1, wherein the geographic location of the first mobile electronic device is determined using land-based triangulation.

5. A device for sending and receiving location-based messaging comprising:
   a display;
   an input interface;
   a wireless transmitter and receiver;
   a Global Positioning System receiver configured to determine a geographic location of the device; and
   a processor,
   wherein the processor is configured to:
      create a map of the device's location based on the geographic location determined by the GPS receiver,
      receive a geographic location of a recipient device,
      add the recipient device's location to the map,
      receive a text input via the input interface,
      create a text message based on the received text input,
      combine the map and the text message,
      launch an application at the first mobile electronic device to display the map, wherein the application updates the map in real time to show movements of the first and second mobile electronic devices, and transmit the combined map and text message to a recipient mobile electronic device upon a user's request, wherein the recipient device is configured to launch an application to display the transmitted map to show the location of the sending device and the location of the recipient device, and wherein the application at the recipient device is configured to update the map automatically in real time to show movements of the sending and recipient devices.

* * * * *